(12) United States Patent
Browder

(10) Patent No.: US 9,598,180 B1
(45) Date of Patent: Mar. 21, 2017

(54) AIRCRAFT LANDING CLEARANCE INDICATION SYSTEM

(71) Applicant: Stephen Browder, Las Vegas, NV (US)

(72) Inventor: Stephen Browder, Las Vegas, NV (US)

( * ) Notice: Subject to any disclaimer, the term of this patent is extended or adjusted under 35 U.S.C. 154(b) by 0 days.

(21) Appl. No.: 14/948,622

(22) Filed: Nov. 23, 2015

(51) Int. Cl.
*G01C 21/00* (2006.01)
*B64D 45/08* (2006.01)
*B64D 43/00* (2006.01)

(52) U.S. Cl.
CPC ............. *B64D 45/08* (2013.01); *B64D 43/00* (2013.01)

(58) Field of Classification Search
None
See application file for complete search history.

(56) References Cited

U.S. PATENT DOCUMENTS

| | | | | |
|---|---|---|---|---|
| 2,559,429 | A | * | 7/1951 | Hewes .................. G08G 5/00 116/324 |
| 2,967,298 | A | * | 1/1961 | Riggins ................ G05G 1/015 340/642 |
| 5,657,009 | A | | 8/1997 | Gordon |
| 7,479,925 | B2 | | 1/2009 | Schell |
| 8,082,070 | B2 | | 12/2011 | Gunn |
| 8,285,427 | B2 | | 10/2012 | Rogers |
| 8,594,863 | B2 | | 11/2013 | Coulmeau |
| 8,599,045 | B2 | | 12/2013 | Khatwa |
| 9,389,769 | B1 | * | 7/2016 | O'Keeffe ............. G06F 1/3262 |
| 2004/0054448 | A1 | | 3/2004 | Ito |
| 2004/0085299 | A1 | * | 5/2004 | Huang .................. G06F 3/0227 345/173 |
| 2016/0009402 | A1 | * | 1/2016 | Hunter .................. B64D 27/24 244/53 R |

FOREIGN PATENT DOCUMENTS

EP        2485205 B1    4/2014

* cited by examiner

*Primary Examiner* — Adolf Dsouza

(57) ABSTRACT

The aircraft landing clearance indication system is constructed of a faceplate that is adapted to be secured against a surface in a cockpit. The faceplate includes a front surface that includes instructions as to operation of the system. A push button is mounted on the front surface of the faceplate. Depression of the push button illuminates the push button providing an instantaneous feedback as to the authorization of the respective airplane to land on a runway. Once the airplane has landed, the push button is depressed a second time in order to reset itself for future use. The aircraft landing clearance indication system is used during the landing checklist.

8 Claims, 3 Drawing Sheets

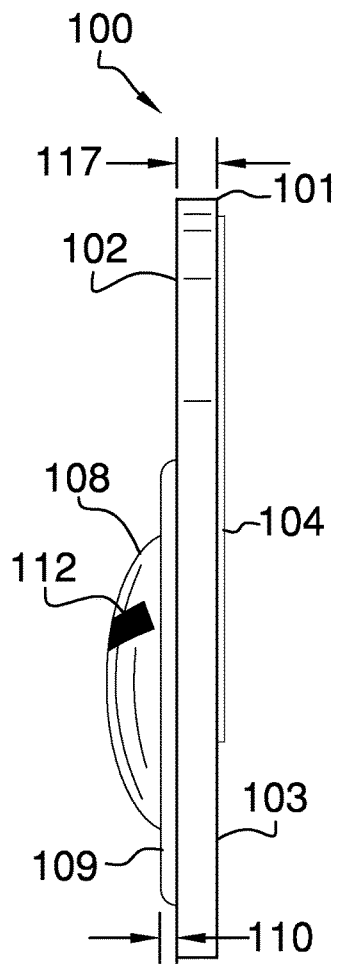
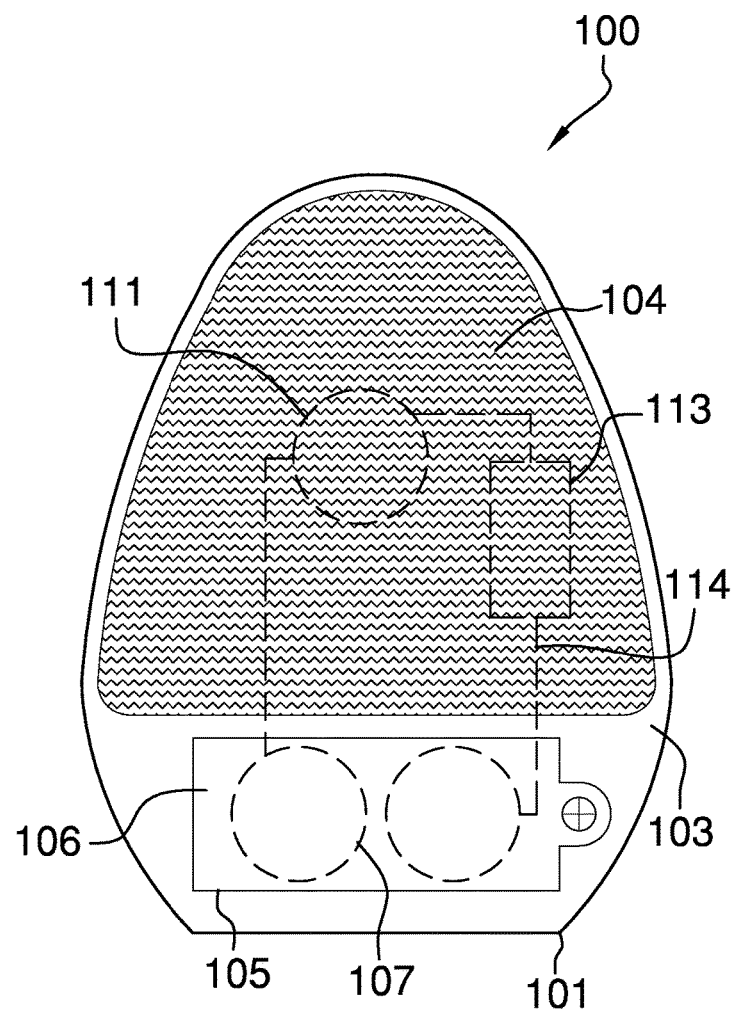
FIG. 2
FIG. 3

AIRCRAFT LANDING CLEARANCE INDICATION SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of aviation accessories, more specifically, a device adapted for use in a cockpit that is a device used to provide a crosscheck as to the clearance of an airplane to land.

Pilots inevitably receive a landing clearance with every flight. There are a multitude of decisions that require exact memory and reaction. One specific decision omitted from the landing checklist is whether or not the airplane has been authorized to land on a specific runway.

The device of the present application seeks to address a need for pilots in the cockpit by providing a simple reminder to confirm that the airplane has been authorized to land on a specific runway.

SUMMARY OF THE INVENTION

The aircraft landing clearance indication system is constructed of a faceplate that is adapted to be secured against a surface in a cockpit. The faceplate includes a front surface that includes instructions as to operation of the system. A push button is mounted on the front surface of the faceplate. Depression of the push button illuminates the push button providing an instantaneous feedback as to the authorization of the respective airplane to land on a runway. Once the airplane has landed, the push button is depressed a second time in order to reset itself for future use. The aircraft landing clearance indication system is used during the landing checklist.

It is an object of the invention to provide a tap light with an illuminated verification that the piloting crew in a cockpit has been authorized to land the respective airplane on a runway.

A further object of the invention is to provide a clearance indication system that can be adaptively mounted in a cockpit adjacent to an instrument cluster in order to provide minimal distraction or occupy a minimal amount of space amongst the various instruments provided on an instrument cluster.

An even further object of the invention is to provide a clearance indication system that is simplistic in construction and use, and which involves depression of the push button to provide a reminder to the piloting crew that the airplane is already authorized to land or the authorization to land needs to occur in the immediate future.

These together with additional objects, features and advantages of the aircraft landing clearance indication system will be readily apparent to those of ordinary skill in the art upon reading the following detailed description of presently preferred, but nonetheless illustrative, embodiments of the aircraft landing clearance indication system when taken in conjunction with the accompanying drawings.

In this respect, before explaining the current embodiments of the aircraft landing clearance indication system in detail, it is to be understood that the aircraft landing clearance indication system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the aircraft landing clearance indication system.

It is therefore important that the claims be regarded as including such equivalent construction insofar as they do not depart from the spirit and scope of the aircraft landing clearance indication system. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a side view of an embodiment of the disclosure.

FIG. 3 is a rear view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
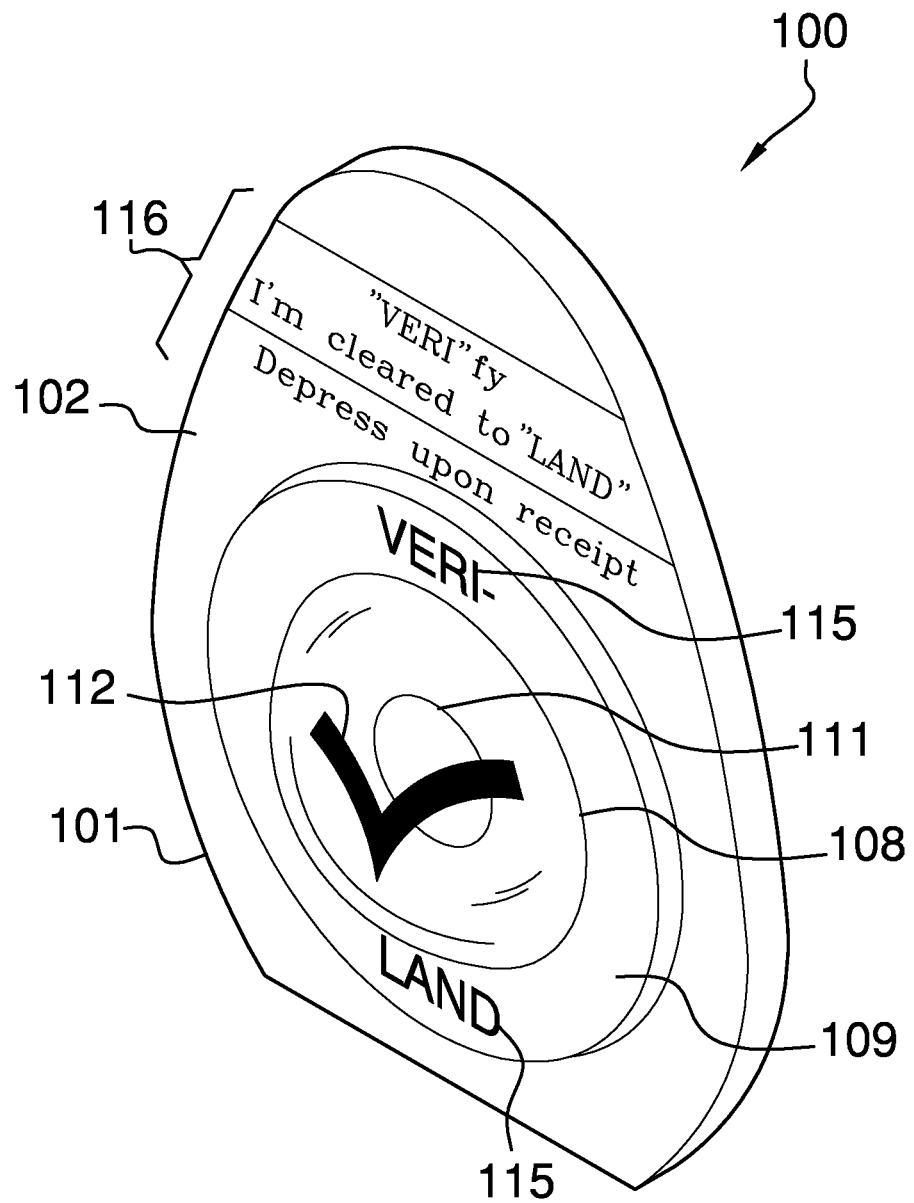
FIG. 1 is a front, perspective view of an embodiment of the disclosure.
Figure 4:
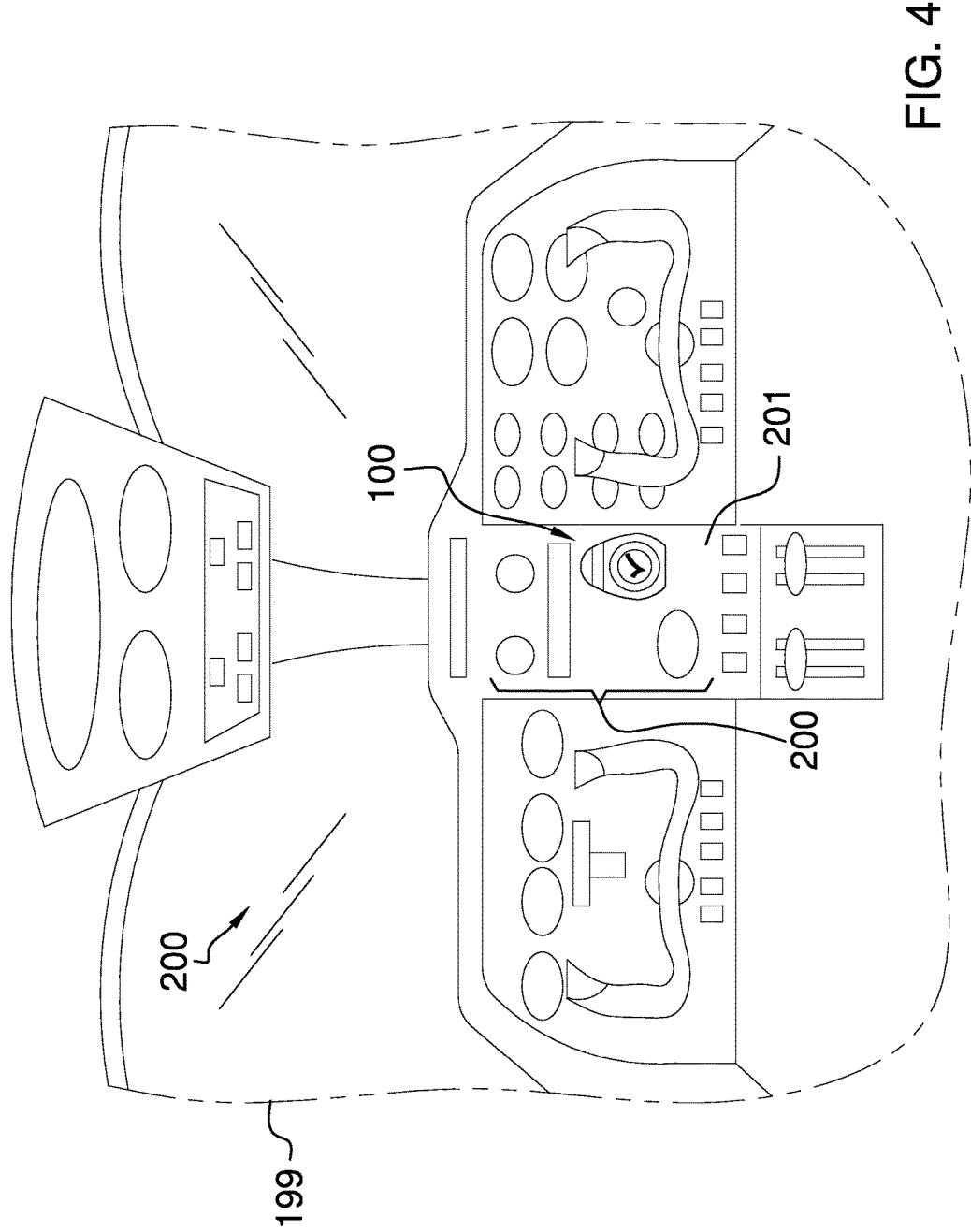
FIG. 4 is a view of an embodiment of the disclosure in use.

As best illustrated in FIGS. 1 through 4, the aircraft landing clearance indication system 100 (hereinafter invention) generally comprises a faceplate 101, which is further defined with a front surface 102 and a rear surface 103. The rear surface 103 includes an adhering member 104 that occupies a portion of the surface area of the rear surface 103.

The adhering member 104 may involve the use of a nylon hook or loop strip that works to temporarily secure the invention 100 against a cockpit surface 201 of a cockpit 200 of an airplane 199. Moreover, the cockpit surface 201 is ideally amongst an instrument cluster 202 so as to be within the purview of a piloting crew. The adhering member 104 may comprise the use of a self-adhesive tape, magnetic backing.

The rear surface 103 also includes a battery compartment 105, which is accessible via a cover 106. Located inside of the battery compartment 105 is at least one battery 107 that is in wired communication with a push button 108.

The push button 108 is located on the front surface 103. The push button 108 is a dome-shaped component that extends outwardly from the front surface 103 of the faceplate 101. Moreover, a shoulder 109 extends from the front surface 103 of the faceplate 101. The shoulder 109 extends a step height 110 from the front surface 103 of the faceplate 101. The shoulder 109 surrounds the push button 108. Moreover, the push button 108 extends outwardly from the shoulder 109.

The push button 108 is made of a translucent material such that a light 111 positioned behind the push button 108 is able to transmit light there through. The push button 108 includes a status identifier 112 thereon. The status identifier 112 may be in the form of a check mark or other emblem that indicates that clearance to land has already occurred.

Referring to FIG. 3, the at least one battery 107 is wired to both the light 111 and an on/off switch 113. The on/off switch 113 is in mechanical connection with the push button 108 such that upon depression of the push button 108, the on/off switch 113 is opening or closing a wiring circuit 114 in order to turn on or off the light 111. The push button 108, wiring circuit 114, and on/off switch 113 are well known in the art pertaining to mini LED tap lights.

The shoulder 109 may include additional identifying information 115 thereon. The additional identifying information 115 may be used in the context of the status identifier 112 to further clarify operation of the invention 100. The front surface 102 of the faceplate 101 includes auxiliary information 116 thereon. The auxiliary information 116 provides additional instructions of how to use the invention 100. More specifically, the auxiliary information 116 includes the words "'VERI"fy I'm cleared to "LAND"' as well as "Depress upon receipt."

The auxiliary information 116, the additional identifying information 115, and the status identifier 112 are all terse, and provide a simplistic explanation of the use of the invention 100 as well as instantaneous feedback as to whether the airplane 199 has obtain clearance to land on a particular runway.

The faceplate 101 has a thickness 117 that is not more than 0.5 inches. The faceplate 101 and the shoulder 109 are made of a material comprising a wood, plastic, metal, or carbon fiber composite. The push button 108 is ideally made of a translucent material such as a glass or plastic. The entire invention 100 should not weight more than 0.75 pounds. The at least one battery 107 may involve the use of a watch battery or a simple AAA battery. The light 111 may involve the use of a light emitting diode or incandescent bulb.

The faceplate 101 may have a polygonal shape; whereas both the shoulder 109 is circular. As previously mentioned, the push button 108 is dome shaped.

It shall be noted that the invention 100 may be integrated into the construction of the cockpit 200, and be an additional instrument on the instrument cluster 202.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An aircraft landing clearance indication system comprising:
   a faceplate that is adapted to be positioned in a cockpit of an airplane;
   a push button is provided on the faceplate;
   upon depression of said push button, a light illuminates a status identifier that provides instantaneous feedback to a piloting crew that clearance to land said airplane on a particular runway has been provided or alternatively needs to be done;
   wherein the status identifier is provided on the push button;
   wherein the push button is made of a translucent material;
   wherein the faceplate is further defined with a front surface and a rear surface;
   wherein the rear surface includes an adhering member that occupies a portion of the surface area of the rear surface;
   wherein the adhering member secures the faceplate against a cockpit surface of said cockpit of said airplane;
   wherein the cockpit surface is amongst an instrument cluster so as to be within the purview of a piloting crew;
   wherein the rear surface includes a battery compartment, which is accessible via a cover;
   wherein the battery compartment houses at least one battery therein; wherein the at least one battery is in wired communication with the light;
   wherein the push button is located on the front surface; wherein the push button is a dome-shaped component that extends outwardly from the front surface of the faceplate;
   wherein a shoulder extends from the front surface of the faceplate; wherein the shoulder extends a step height from the front surface of the faceplate.

2. The aircraft landing clearance indication system according to claim 1 wherein the adhering member comprises nylon hook or loop strip, self-adhesive tape, or magnetic backing.

3. The aircraft landing clearance indication system according to claim 1 wherein the shoulder surrounds the push button; wherein the push button extends outwardly from the shoulder.

4. The aircraft landing clearance indication system according to claim 3 wherein the push button is made of a translucent material; wherein the light is positioned behind the push button; wherein the light is able to transmit light through the push button in order to illuminate the status identifier provided on the push button.

5. The aircraft landing clearance indication system according to claim 4 wherein the at least one battery is wired to both the light and an on/off switch.

6. The aircraft landing clearance indication system according to claim 5 wherein the on/off switch is in mechanical connection with the push button such that upon depression of the push button, the on/off switch opens or closes a wiring circuit in order to turn on or off the light.

7. The aircraft landing clearance indication system according to claim 6 wherein the shoulder includes additional identifying information thereon; wherein the additional identifying information is used in the context of the status identifier to provide further clarification.

8. The aircraft landing clearance indication system according to claim 7 wherein the front surface of the faceplate includes auxiliary information thereon; wherein the auxiliary information provides additional instructions of how to use the aircraft landing clearance indication system.

\* \* \* \* \*